United States Patent
Neumann

(10) Patent No.: US 11,374,920 B2
(45) Date of Patent: *Jun. 28, 2022

(54) AUTHENTICATION SYSTEM AND AUTHENTICATION METHOD USING PERSONAL ELECTRONIC IDENTITY GADGETS

(71) Applicant: ADUCID S.R.O., Prizrenice (CZ)

(72) Inventor: Libor Neumann, Stodulky (CZ)

(73) Assignee: ADUCID S.R.O., Prizrenice (CZ)

( * ) Notice: Subject to any disclaimer, the term of this patent is extended or adjusted under 35 U.S.C. 154(b) by 24 days.

This patent is subject to a terminal disclaimer.

(21) Appl. No.: 16/968,030

(22) PCT Filed: Feb. 19, 2019

(86) PCT No.: PCT/CZ2019/050005
§ 371 (c)(1),
(2) Date: Aug. 6, 2020

(87) PCT Pub. No.: WO2019/158137
PCT Pub. Date: Aug. 22, 2019

(65) Prior Publication Data
US 2021/0367936 A1     Nov. 25, 2021

(30) Foreign Application Priority Data

Feb. 19, 2018   (CZ) .................... CZ2018-81

(51) Int. Cl.
H04L 67/1095   (2022.01)
H04L 67/306    (2022.01)
H04L 9/40      (2022.01)

(52) U.S. Cl.
CPC ........ H04L 63/0815 (2013.01); H04L 63/102 (2013.01); H04L 67/1095 (2013.01); H04L 67/306 (2013.01)

(58) Field of Classification Search
None
See application file for complete search history.

(56) References Cited

U.S. PATENT DOCUMENTS

| | | | |
|---|---|---|---|
| 8,868,467 B2* | 10/2014 | Serebrennikov | H04L 67/10 705/75 |
| 9,054,919 B2* | 6/2015 | Kiang | G06Q 10/101 |
| 9,215,226 B2* | 12/2015 | Sanso | H04L 63/08 |
| 9,503,452 B1* | 11/2016 | Kumar | H04L 67/306 |
| 10,237,599 B1* | 3/2019 | Gravino | H04N 21/6118 |
| 10,299,118 B1* | 5/2019 | Karachiwala | H04L 67/26 |
| 2007/0106612 A1* | 5/2007 | O'Brien | G06Q 20/023 705/44 |
| 2009/0288138 A1* | 11/2009 | Kalofonos | H04L 67/104 726/2 |
| 2010/0188975 A1* | 7/2010 | Raleigh | H04M 15/61 370/230.1 |
| 2014/0099922 A1* | 4/2014 | Cazanas | H04W 12/06 455/411 |
| 2015/0304110 A1* | 10/2015 | Oberheide | H04L 9/3247 713/155 |
| 2016/0261593 A1 | 9/2016 | Bradley et al. | |
| 2018/0070208 A1* | 3/2018 | Alharayeri | H04L 63/102 |
| 2018/0302405 A1* | 10/2018 | Gordon | H04W 12/06 |

FOREIGN PATENT DOCUMENTS

| | | |
|---|---|---|
| DE | 102010018700 A1 | 11/2011 |
| WO | 9726481 A1 | 7/1997 |
| WO | 2013000959 A1 | 1/2013 |
| WO | 2017005232 A1 | 1/2017 |

OTHER PUBLICATIONS

International Search Report and Written Opinion for corresponding PCT application No. PCT/CZ2019/050005, dated Jun. 26, 2019.

* cited by examiner

*Primary Examiner* — Davoud A Zand
(74) *Attorney, Agent, or Firm* — Notaro, Michalos & Zaccaria P.C.

(57) ABSTRACT

An authentication system for use with personal electronic identity gadgets of at least one user of services in that the personal electronic identity gadgets are configured to authenticate to a main service provider and are configured to trigger synchronization of data storages of service providers. The system has a data storage of an authentication system server component of at least one main service provider. The data storage is synchronizable with data storage(s) of server component(s) of at least one other service provider, either directly or via personal electronic identity gadgets, and the authentication system server component of the at least one main service provider is configured for mapping personal electronic identity gadgets to the account of the user of services. The system offers an authentication method that allows to recover from emergencies and/or increase the user comfort and/or increase security.

13 Claims, No Drawings

US 11,374,920 B2

AUTHENTICATION SYSTEM AND AUTHENTICATION METHOD USING PERSONAL ELECTRONIC IDENTITY GADGETS

FIELD OF THE INVENTION

The present invention relates to an authentication system and methods of authenticating users to service providers, which allows the user to use more than one personal electronic identity gadget mapped to a user account, the personal electronic identity gadgets can be used even with service providers to which only another personal electronic identity gadget of the same user was registered so far. In preferred embodiments, the system and the method offer further advanced functions and further increase both user comfort and security of the authentication system.

BACKGROUND ART

Authentication systems and procedures allow users to have a secure access to services provided by service providers, e.g. services of banks, internet shops, mobile operators, authentication and certification authorities and many more.

One possibility of authentication to the service provider is an authentication utilizing a personal electronic identity gadget (PEIG). This PEIG may be e.g. a chip card, a USB key, a cell phone, a tablet, a computer, a computer program saved in the memory of a computer, of a cell phone, or of a tablet etc. The authentication methods using a personal electronic identity gadget are well-known to persons skilled in the art.

For users, it is often comfortable and secure to have more than one PEIG, so when one of these gadgets is lost or stolen, it can be replaced by another spare PEIG. The service provider can also create separate user accounts for those PEIGs or assign them all to one user account and treat them as mutual backups. These procedures are well-known.

On the other hand, many users use the same PEIG for the authentication to more service providers. Currently, it means that the user has to register all PEIGs to each service provider. When one PEIG is lost, all service providers must be requested by the user to block this PEIG against unauthorized use. Similarly, when a new identity verification is needed or when the cryptographic material in the PEIG gets old, the necessary steps must be performed by the user with each service provider.

The aim of the present invention is to provide a system and method of user authentication to services provided by service providers that will allow PEIGs previously assigned to a user account with one service provider to be used arbitrarily and interchangeably with other service providers, and that will simplify the steps necessary when one or more PEIGs are lost or stolen, when a new user identity verification is needed, and in other situations as well. Thus, the invention shall significantly improve both user comfort and security during the authentication process.

DISCLOSURE OF THE INVENTION

The object of the invention is an authentication system for use with personal electronic identity gadgets (PEIGs) of at least one user of services, wherein the said personal electronic identity gadgets are configured to authenticate to a main service provider (for all PEIGs of this service user) and are configured to trigger synchronization of data storages of service providers; wherein the said system comprises a data storage of an authentication system server component of at least one main service provider, wherein the said data storage is synchronizable with data storage(s) of server component(s) of at least one other service provider, either directly or via personal electronic identity gadgets, and wherein the said authentication system server component of the at least one main service provider is configured for mapping personal electronic identity gadgets to the account of the user of services (user account);

a data storage of an authentication system server component of at least one other service provider that is synchronizable with the data storage of the authentication system server component of the at least one main service provider, either directly or via personal electronic identity gadget;

wherein:

the data storage of the authentication system server component of each service provider contains, for each personal electronic identity gadget registered to this provider for the said user of services, a record with data for authenticating this personal electronic identity gadget, the data storage of the authentication system server component of the main service provider contains identifiers assigned to personal electronic identity gadgets and/or to users, wherein for each personal electronic identity gadget of a user and/or for each user, a separate identifier is assigned for each service provider for whom at least one personal electronic identity gadget of the user is assigned to the user account;

the data storage of the authentication system server component of the main service provider contains a map of personal electronic identity gadgets for each user account, in the said map the records for all personal electronic identity gadgets of the said user in the said data storage are mapped to the said user account, furthermore the map contains the identifiers assigned to the personal electronic identity gadgets of the said user for all service providers and/or the identifiers assigned to the said user for all service providers;

the data storage of the authentication system server component of other service provider contains at least the identifiers assigned to personal electronic identity gadgets and/or to users of this other service provider;

the data storage of the authentication system server component of other service provider contains a map of personal electronic identity gadgets for each user account, wherein in the said map, the records for all personal electronic identity gadgets of the said user in this data storage are mapped to the said user account, furthermore the map contains the identifiers assigned to the personal electronic identity gadgets of the said user for at least this other service provider and/or the identifier assigned to the said user for at least this other service provider;

the data storages and/or the authentication system server components are configured so that the identifiers assigned to the personal electronic identity gadgets assigned to the account of one user and/or identifiers assigned to one user are synchronizable by transmitting synchronization information between the data storages of the authentication system server components and/or between the authentication system server components, directly or via personal electronic identity gadgets.

Another object of the present invention is a method of user authentication using a personal electronic identity gadget (PEIG) in the authentication system for use with the said personal electronic identity gadgets of at least one user of services, wherein the said personal electronic identity gadgets are configured to authenticate to a main service provider (for all PEIGs of this service user) and are configured to trigger synchronization of data storages of service providers; wherein the said system comprises a data storage of an authentication system server component of at least one main service provider, wherein the said data storage is synchronizable with data storage(s) of server component(s) of at least one other service provider, either directly or via personal electronic identity gadgets, and wherein the said authentication system server component of the at least one main service provider is configured for mapping personal electronic identity gadgets to the account of the user of services (user account);

a data storage of an authentication system server component of at least one other service provider that is synchronizable with the data storage of the authentication system server component of the at least one main service provider, either directly or via personal electronic identity gadget;

wherein the method is characterized in that in the data storage of the authentication system server component of the main service provider, a record containing data for authentication of the personal identity gadget is assigned to each personal electronic identity gadget during its registration to the user account;

in the data storage of the authentication system server component of the main service provider, the records of all personal electronic identity gadgets assigned to the account of one user of services are mapped to a map of personal electronic identity gadgets for the said user account; and identifiers assigned to all personal electronic identity gadgets of the said user or/and to the said user are mapped to the said map of personal electronic identity gadgets for the said user account, wherein a separate identified is assigned to each personal electronic identity gadget of the said user and/or to the said user for each service provider for whom any personal electronic identity gadget of this user is registered;

and when any personal electronic identity gadget of the user is used at least for the first authentication to an other service provider, this personal electronic identity gadget connects and authenticates to the main service provider and requests synchronization information from the authentication system server component of the main service provider, said synchronization information containing the map of personal electronic identity gadgets mapped to the said user's account and containing information on identifiers assigned to all personal electronic identity gadgets mapped to the map for at least the said other service provider and/or on identifiers assigned to the said user for at least the said other service provider; then the personal electronic identity gadget transmits this synchronization information to the authentication system server component of the said other service provider, wherein the authentication system server component of the said other service provider uses the synchronization information to amend the map of personal electronic identity gadgets and the information on identifiers in its data storage.

In a preferred embodiment, the object of the invention is an authentication system for use with personal electronic identity gadgets (PEIGs) of at least one user of services, wherein the said personal electronic identity gadgets are configured to authenticate to a main service provider (for all PEIGs of this user of services) and are configured to trigger synchronization of data storages of service providers; wherein the said system comprises a data storage of an authentication system server component of at least one main service provider, wherein the said data storage is synchronizable with data storage(s) of server component(s) of at least one other service provider, either directly or via personal electronic identity gadgets, and wherein the said authentication system server component of the at least one main service provider is configured for mapping personal electronic identity gadgets to the account of the user of services (user account);

a data storage of an authentication system server component of at least one other service provider which is synchronizable with the data storage of the authentication system server component of the at least one main service provider, either directly or via personal electronic identity gadget;

wherein:

the data storage of the authentication system server component of each service provider contains, for each personal electronic identity gadget of the said user of services, a record with data for authenticating this personal electronic identity gadget, the data storage of the authentication system server component of the main service provider contains a map of personal electronic identity gadgets for each user account, in the said map the records for all personal electronic identity gadgets of the said user in the said data storage are mapped to the said user account, furthermore the map contains identifiers assigned to the personal electronic identity gadgets of the said user for all service providers, wherein a separate identifier is assigned for each personal electronic identity gadget of the said user for each service provider for whom at least one personal electronic identity gadget is registered for the said user account;

the data storage of the authentication system server component of other service provider contains a map of personal electronic identity gadgets for each user account, wherein in the said map, the records for all personal electronic identity gadgets of the said user in this data storage are mapped to the said user account, furthermore the map contains the identifiers assigned to the personal electronic identity gadgets of the said user for at least this other service provider (and optionally for further other service providers for whom at least one personal electronic identity gadget is registered for the said user account);

the data storages and/or the authentication system server components are configured so that the identifiers assigned to the personal electronic identity gadgets assigned to the account of one user are synchronizable by transmitting synchronization information between the data storages of the authentication system server components and/or between the authentication system server components, directly or via personal electronic identity gadgets.

In a preferred embodiment a method of user authentication using a personal electronic identity gadget (PEIG) in the authentication system for use with the said personal electronic identity gadgets of at least one user of services is provided, wherein the said personal electronic identity gadgets are configured to authenticate the user to a main service provider (for all PEIGs of this service user) and are configured to trigger synchronization of data storages of service providers; wherein the said system comprises a data storage of an authentication system server component of at least one main service provider, wherein the said data storage is synchronizable with data storage(s) of server component(s) of at least one other service provider, either directly or via personal electronic identity gadgets, and wherein the said authentication system server component of the at least one main service provider is configured for mapping personal electronic identity gadgets to the account of the user of services (user account);

a data storage of an authentication system server component of at least one other service provider that is synchronizable with the data storage of the authentication system server component of the at least one main service provider, either directly or via personal electronic identity gadget;

wherein the method is characterized in that in the data storage of the authentication system server component of the main service provider, a record containing data for authentication of the personal identity gadget is assigned to each personal electronic identity gadget;

in the data storage of the authentication system server component of the main service provider, the records of all personal electronic identity gadgets assigned to the account of one user of services are mapped to a map of personal electronic identity gadgets for the said user account; and identifiers assigned to all personal electronic identity gadgets of the said user are mapped to the said map of personal electronic identity gadgets for the said user account, wherein a separate identifier is assigned to each personal electronic identity gadget of the said user for each service provider for whom at least one personal electronic identity gadget of this user is registered; and when any personal electronic identity gadget of the user is used at least for the first authentication to an other service provider, this personal electronic identity gadget connects and authenticates to the main service provider and requests synchronization information from the authentication system server component of the main service provider, said synchronization information containing the map of personal electronic identity gadgets mapped to the said user's account and containing information on identifiers assigned to all personal electronic identity gadgets mapped to the map for at least the said other service provider for at least the said other service provider; then the personal electronic identity gadget transmits this synchronization information to the authentication system server component of the said other service provider, wherein the authentication system server component of the said other service provider uses the synchronization information to amend the map of personal electronic identity gadgets and the information on identifiers in its data storage.

The authentication system according to the invention thus uses personal electronic identity gadgets (for one user, it can use one or more identity gadgets) and allows the user to assign more than one personal electronic identity gadget to his account. In the following text, this process of assigning gadgets to a user account is called also "replica" or "replica creation". Subsequently the user can use these personal identity gadgets arbitrarily and interchangeably with any service provider, provided that the user registers at least one PEIG to this service provider either before or after creating the replica.

The personal electronic identity gadgets are assigned to a user account at the main service provider. The main service provider is identical for all personal electronic identity gadgets of one user of services, thus for all his personal electronic identity gadgets assigned to his user account. The data storage of the authentication system server component of the said main service provider is central for the relevant user account and his personal electronic identity gadgets. It is preferred when main service provider server with the database is continuously accessible. The main service provider does not have to be the same for all users, however all personal electronic identity gadgets are configured for authenticating their user account to the respective main service provider.

The term "authentication" in this text stands for verifying the identity.

The term "other service provider" is used for any service provider that is not the main service provider for the personal electronic identity gadgets of the respective user.

The ability of the PEIG to authenticate to the main service provider can be enabled either by equipping it with information on the main service provider, or by equipping it with an application having access to information on the main service provider, or by providing it with a connection to the application of the main service provider that transmits the relevant information, or by other means, based on the type and purpose of the PEIG.

When used for the first time for authentication to each other service provider, the personal electronic identity gadget tries to connect and authenticate to the main service provider. If it has already been assigned to a user account (replica was created) at the main service provider, then preferably a record for this PEIG is created at the said other service provider upon the first registration (assigning) of the personal electronic identity gadget to the said other service provider, and a map of PEIGs and their identifiers is synchronized from the main service provider.

When registering a PEIG to an other service provider and said PEIG is not yet assigned to any user account at the main service provider, a valid map for this PEIG cannot be obtained. Only when the PEIG is assigned to a user account at the main service provider (replica is created), it triggers synchronization of the map with mapped identifiers from the main service provider to all other service providers where it was already used (assigned, identity created).

When assigning a further PEIG to a user account at the main service provider, a record for this further PEIG is created and this record is mapped to the map of the PEIGs for this user account. At the same time the authentication system server component of the main service provider generates the identifiers so that an identifier is assigned to each PEIG and to each service provider having registered at least one PEIG mapped to the map and/or an identifier assigned to the user and to each service provider having registered at least one PEIG mapped to the map. So the identifiers are generated and assigned also to combinations of PEIGs and other service providers, at which these PEIGs have not been registered. Nevertheless at the moment of using such PEIG at such other service provider for the first time, the PEIG triggers a synchronization of the map of PEIGs and a synchronization of the identifiers. So in this preferred embodiment the other service provider uses the identifiers to verify that the PEIG is assigned to the account of its user and it does not need to be assigned to the user account at this other service provider anew. Optionally, the synchronization of the map can be triggered at each service provider when assigning each further PEIG to the user account at the main service provider.

The map of PEIGs at each service provider is configured so that for each PEIG record, the relevant map of PEIGs can be identified, and for each map of PEIGs, the records of all PEIGs relevant to the said map in the data storage of the relevant service provider can be identified. Furthermore, for each map of PEIGs at each other service provider, the identifiers for each PEIG mapped to this map and for at least the relevant other service provider (optionally also for further service providers) and/or identifiers assigned to the user for at least this other service provider (optionally also for further service providers) can be identified. To each map of PEIGs at the main service provider, identifiers are mapped for each PEIG and for each service provider having registered at least one of the PEIGs mapped to the said map and/or identifiers are mapped for the user and for each service provider having registered at least one of the PEIGs mapped to the said map.

The requirement for the synchronizability of the data storage of a service provider "either directly or via PEIG" has to be interpreted so that the data storage can be synchronized with the data storage of another service provider using any of these methods according to needs or requirements. The data storage synchronization always encompasses creating synchronization information from the data contained in one data storage and transmitting it to another data storage, and appropriately amending the data in the said another data storage.

The term "each service provider" encompasses both the main service provider and other service providers, if not specified otherwise.

The terms "registered", "register", "registration" stand for assigning the PEIG, particularly the first PEIG, to the user account at any other service provider or at the main service provider. Assigning the PEIG (particularly the second PEIG and the following PEIGs) to the user account at the main service provider is called also "replica creation".

The term "synchronization information" represents information created so that it contains the necessary data such as the information about the map of PEIGs for the relevant user account and the information about identifiers for the PEIGs mapped to the map and/or for the user. Methods suitable for creating the synchronization information are known in the art. The synchronization information can be e.g. cryptographically protected or marked with a time stamp if needed.

The term "data storage" should be understood as any device or system capable of storing and preserving data as well as of processing them. Examples include a database, a file system, an operating memory, a hard drive, etc.

A PEIG suitable for use in the authentication system according to the invention is configured for connection and authentication to the main service provider during at least the first authentication to an other service provider, for triggering the synchronization of the map for the relevant user account from the main service provider to the other service provider and for triggering the synchronization of identifiers assigned to all PEIGs of this user and/or to users for at least this other service provider.

The personal electronic identity gadget (PEIG) can be e.g. a cell phone, a tablet, a chip card, a USB key ring, a smart watch, an electronic bracelet, an electronic pendant, or another object suitable for authentication to service providers that is known to the skilled person.

The term "identifier" is known to the skilled person, as well as the common technical features of the identifier. The identifier is unique especially within its identificator space (identificator framework), thus the system ensures that the same identifier is not assigned to two different objects within the relevant identificator space. The same identifier must not be assigned to two different PEIGs for one service provider; the same identifier must not be assigned to two different users for one service provider. However the same identifier can (but does not have to) be assigned to the same PEIG or to the same user for different service providers, because each service provider has its own identificator framework.

In addition to the herein mentioned identifiers, the system may also contain local identifiers assigned to a PEIG and/or to a user at the data storage of a service provider, the local identifiers are not transmitted to any further service provider. The local identifiers are then linked with identifiers assigned to the PEIG and/or to the user by the main service provider for the relevant service provider.

Authentication procedures and methods of secure information transfer used within the framework of this invention may include any suitable authentication procedures and methods of secure information transfer known in the field. Person skilled in the art can evaluate their suitability and applicability for this invention and put them into practice. To connect the PEIG to the main and the other service provider for synchronization of the data, procedures known in the field can be used, e.g. procedures according to the patent application PCT/CZ2016/050024.

The service provider may be any provider of electronic services, e.g. provider of electronic banking, mobile operator, provider of electronic databases, provider of identity verification (Identity provider), provider of public transport (electronic tickets), building entrance control (electronic entrance system), internet shop, provider of medical services (electronic health service), etc.

The authentication system server component is a part of the authentication system (usually embodied in a software) that is stored and run on the server of the relevant service provider. Usually this server component communicates with the user via a user interface.

When using any arbitrary PEIG for authentication to an other service provider for the first time, the PEIG also connects and authenticates to the main service provider and requests the synchronization information. The synchronization information contains a map of PEIGs and identifiers assigned to all PEIGs incorporated into this map and/or identifiers of the user for at least this service provider.

After obtaining the synchronization information the PEIG transmits this synchronization information to the said other service provider, which uses this synchronization information in an appropriate manner to amend its map of PEIGs for the relevant user account and to amend the identifiers assigned to all PEIGs mapped to the map for the relevant user account and/or the identifiers assigned to the relevant user.

This ensures that all service providers have information on PEIGs of the relevant user and they timely get identifiers for authentication with a PEIG of the user that was never registered with them specifically.

Preferably, the synchronization information is requested and transmitted at least in the beginning of the process of authentication using a PEIG with an other service provider for the first time. This facilitates the procedure when the PEIG being used for the authentication was never used by the user for this service provider before. Using the transmitted synchronization information, the service provider can verify that this PEIG is mapped to the map of PEIGs of the relevant user and the identifier assigned to this PEIG for this service provider is available to the service provider and can be used in the authentication process.

When one of PEIGs is then registered to a new service provider, the PEIG connects and authenticates to the main service provider, requests the main service provider to generate identifiers for all PEIGs mapped to the map of PEIGs and for this new service provider, and/or to generate identifiers for the user and for this new service provider; the PEIG also requests from the main service provider the creation of the synchronization information containing the map of PEIGs and the identifiers assigned to all PEIGs mapped to the map, and/or assigned to the user, for at least this service provider, optionally for at least one more other service provider or for all service providers having registered at least one PEIG of this user. Then the PEIG transmits this synchronization information to this new service provider.

Thus, the synchronization procedure and the requesting and transmitting of the synchronization information via the PEIG ensures that the new service provider has all PEIGs of the relevant user assigned to the user's account, and it has for any and all of them and/or for the user an identifier usable for authentication. At the same time the main service provider has information on the new other service provider which can advantageously be used when dealing with emergency situations.

Further, a preferred embodiment is described which is suitable for resolving problems caused by loss or destruction of a PEIG.

In this case, the authentication system is configured to transmit synchronization messages (synchronization information) between the main service provider and other service providers directly via a synchronization channel, without the need for transfer via a PEIG. This feature improves the system security by enabling a reliable and fast blocking of the lost, destroyed or stolen PEIG.

When the first identity gadget is lost, destroyed or stolen, the user authenticates to the main service provider with another PEIG that he still has at hand, and he enters a command to revoke centrally the first (lost) PEIG. The authentication system server component of the main service provider then prepares a synchronization message flagging the first PEIG for blocking and/or for rejection of authentication; this synchronization message is then transmitted via synchronization channels to all other service providers having registered any PEIGs mapped to the map of PEIGs of the relevant user. The other service providers use this synchronization message to amend the data in databases of their autentication system server components, and if anybody tries to use this first PEIG with any of them, the PEIG is blocked and/or the authentication is rejected. To identify this first (lost) PEIG, the other service providers use the identifiers assigned to this PEIG mapped to their maps of PEIGs for this user.

When all PEIGs are lost, destroyed or stolen, the authentication system according to the invention preferably provides an entry for the administrator (e.g. an authorized person) of the main service provider, who after verifying the user's identity enters a command to revoke centrally all PEIGs of this user. The authentication system server component of the main service provider then prepares a synchronization message flagging all PEIG for blocking and/or for rejection of authentication; this synchronization message is then transmitted via synchronization channels to all other service providers having registered any PEIGs mapped to the map of PEIGs for this user. The other service providers use this synchronization message to amend the data in databases of their authentication system server components; if anybody tries to use any of these PEIGs at any of them, the PEIG is blocked and/or the authentication is rejected. To identify these PEIGs, the other service providers use the identifiers assigned to these PEIGs mapped to their maps of PEIGs for this user.

Yet further, a preferred embodiment of the invention is described which resolves the problems caused by one or more PEIGs of a user having an invalid (e.g. outdated) cryptographic material for authentication to one or more other service providers, for example when it was not used for this authentication for a long time and it is kept as a backup PEIG. In this embodiment the cryptographic material for authenticating to the main service provider is not invalid (e.g. outdated) in the PEIG.

When using this PEIG for authentication to an other service provider, this other service provider determines the cryptographic material in the PEIG to be invalid. Due to this determination, the authentication of the PEIG to this other service provider is rejected, so the PEIG acts in the same way as when authenticating (registering) to the other service provider for the first time, thus it connects and authenticates to the main service provider, requests the main service provider to create synchronization information containing a map of PEIGs and identifiers assigned to all PEIGs mapped to the map for at least this service provider, and transmits this synchronization information to the said other service provider. Subsequently after having compared the map of PEIGs saved originally at this other service provider with the newly transmitted map or after analyzing the identifier for the relevant PEIG, a new cryptographic material for authentication of this PEIG is created.

If the cryptographic material in the PEIG is determined invalid also for authentication to the main service provider, the authentication system according to the invention preferably provides an entry for the administrator (e.g. an authorized person) of the main service provider, who after verifying the user's identity allows the creation or creates a new cryptographic material of the said PEIG at the main service provider without cancelling the mapping of the said PEIG to the map of PEIGs for the relevant user. For other service providers, the procedure described in the preceding paragraph is used.

A preferred embodiment of the invention, in which an identifier assigned to the user is mapped to the map of PEIGs, allows the centralized user identity verification to be used.

The centralized user identity verification is performed by a provider of verification services. The provider of verification services may be identical with the main service provider for the relevant user or it may be a different entity.

The identifiers assigned to users for each service provider can be generated either by the main service provider, or by the provider of verification services, or by an other service provider, optionally transmitted to the main service provider, mapped to the map of PEIGs of this user in the data storage of the authentication system server component of the main service provider, and at least the identifier assigned to the user for the relevant other service provider is saved into the data storage of the authentication system server component of this other service provider and they are a part of the synchronization information. In the further text they are called "user identifier" or "user reference identifier".

In addition to the user identifier for each service provider which is a part of the synchronization information, a local user identifier is provided for each service provider, the local identifier is not transmitted anywhere, but it is mapped to the map of PEIGs of the relevant user for the relevant service provider. The local identifier is generated by the relevant service provider, where it is located.

During the centralized identity verification, the provider of verification services verifies the user identity e.g. using an identification document; if the provider of verification services differs from the main service provider, it transmits the result of the user identity verification to the main service provider. The result of the user identity verification is then transmitted to an other service provider as part of synchronization information or during a separate operation of transmission of the results of the user identity verification, together with a user reference identifier for the relevant other service provider, and on the basis of the user reference identifier the verification result is linked with the relevant local user identifier assigned to the user at the said other service provider. Transmission of the synchronization information or transmission of the results of the user identity verification during a separate operation of transmission of the results of the user identity verification can take place either directly between the authentication system server components of the service providers, or via PEIGs.

The system according to the invention can be used to verify the user identity and to transmit the result of the verification by way of its linking with the map of PEIGs for this user and/or its linking with user reference indicators for other service providers.

The same procedures can be used for a repeated user identity verification or when the user personal information is changed, so the user has to undergo the process of identity verification or personal information change only with one provider of verification services; then the authentication system according to the invention transmits the relevant information to all or selected other service providers. In addition to this, the system preferably allows to control the content of the transmitted personal information with respect to valid legislation on private data protection.

Yet further preferred embodiment allows to perform a direct transaction (data transmission) between two service providers (e.g. between the main service provider and an other service provider, or between two other service providers) when a PEIG is connected to one service provider, wherein the relevant local identifiers of this user mapped to the map of PEIGs for this user are available at data storages of authentication system server components of both service providers. Furthermore, this embodiment uses the ability of the authentication system to transmit the data to be transmitted directly between any service providers.

In this procedure the PEIG cooperates with authentication system server components of both service providers and the authentication system server component of one service provider generates a one-time user identifier that is transmitted to the authentication system server component of the other service provider via PEIG. In data storages of authentication system server components of both service providers, the one-time user identifier is linked with the relevant local identifier of this user. Consequently the application that requires the transaction to be processed at the second service provider requests completion of the transaction and transmits the transaction parameters and the local user identifier for the second service provider to the authentication system server component of the second service provider. The second server component uses the local user identifier to search for the linked one-time user identifier in its data storage and transmits the request for completion of the transaction, transaction parameters, and the one-time user identifier to the authentication system server component of the first service provider via a direct synchronization channel The server component of the authentication system of the first service provider uses the one-time user identifier to find the local user identifier for the first service provider in its data storage and transmits this local user identifier and transaction parameters to the application involved in the transaction at the first service provider. When the transaction is completed, both service providers remove the one-time user identifier from their data storages. Thus for each transaction a separate one-time user identifier is generated. This prevents the transaction to be processed without user's knowledge.

Individual preferred embodiments can be combined as needed, wherein the authentication system as defined in claims is useful for their implementation.

EXAMPLES OF CARRY OUT THE INVENTION

List of abbreviations used in examples:
PEIG—personal electronic identity gadget;
AIM—authentication system server component of a service provider;
AIM database—data storage of authentication system server component of a service provider;
Map or PEIG Map—map of personal electronic identity gadgets;
UDI—local user identifier (user database index);
URID—user reference identifier;
UOTID—user one-time identifier;
Xx (e.g. Ba, Aa)—labels for identifiers of personal electronic identity gadgets, capital letters refer to service providers, small letters refer to personal electronic identity gadgets.

The main service provider is marked A, if not stated otherwise.

Other service providers are marked with further letters of the alphabet.

EXAMPLE 1

Assigning Several PEIGs to the Account of One User, Their Interchangeable Use for Authentication The user creates a replica, i.e. assigns two or more PEIGs to his account only with main service provider. He wants to use his PEIGs with other service providers, however he does not want to repeat the replica creation process, but still wants to use both (or all) PEIGs to access his user account with an other provider.

First of all, the user creates a replica of the PEIG a and the PEIG b with the main service provider A, after that he uses the first PEIG a with the other service provider B and finally uses the second PEIG b with the other service provider B.

When creating a replica of the PEIG a and the PEIG b with the main service provider A, the AIM A generates unique identifiers Ba and Bb designated for the other service provider B and assigned to the PEIG a and PEIG b. These identifiers are saved to the record called PEIG Map for further use. The AIM A saves also other pieces of information to the PEIG Map, such as the time of creating the replica, local identifiers for PEIGs designated to be used by the main service provider A (i.e. identifiers Aa and Ab).

When using the PEIG a at the other service provider B for the first time, the PEIG a is used to transmit a part of the PEIG Map from the AIM A to the AIM B, particularly the identifiers Ba and Bb, with the information that the identifier Ba belongs to the PEIG a and the identifier Bb belongs to the PEIG b, which is a replica of the PEIG a. The AIM B uses the received synchronized PEIG Map to create its own record PEIG Map that is stored for further use. This record contains information that the identifier Ba defined by the service provider A belongs to the PEIG a and that PEIG a is in replica (i.e. assigned to the account of the same user) with the PEIG b, to which the service provider A assigned the identifier Bb.

When using the PEIG b with the other service provider B for the first time, the PEIG b is used to transfer a part of the PEIG Map from the AIM A to the AIM B, particularly the identifiers Ba and Bb, with the information that the identifier Bb belongs to the PEIG b and the identifier Ba belongs to the PEIG a that is in replica with the PEIG b.

The AIM B uses the identifiers Ba or Bb in the received synchronized PEIG Map to search for a previously saved PEIG Map assigned to the PEIG a. That map contains the same identifiers Ba and Bb as the received PEIG Map provided that the PEIG b belongs to the replica created at the main provider A. In that situation the AIM B assigns the PEIG b to the user account related to the PEIG a. Thus the user is granted access also via the second PEIG b.

To each PEIG Map record are mapped records of all PEIGs assigned to the relevant user account, here PEIG a and PEIG b, containing the data necessary to process the authentication of the PEIGs a and b. This applies analogously for all examples described herein further. This procedure can be applied to any number of other providers in the same way.

EXAMPLE 2

Assigning Several PEIGs to the Account of One User, Their Interchangeable Use for Authentication This example describes the situation, when the user first uses the first PEIG a with the main service provider A then uses the PEIG a with the other provider B, after that the user creates a replica of the PEIG a and PEIG b (i.e. assigns both PEIGs to the account of one user) at the main service provider A, and finally he uses the other PEIG b with the other service provider B.

When using the PEIG a with the main service provider A for the first time, a unique identifier Aa is created and the AIM A saves it into a PEIG Map. When using the PEIG a with the other service provider B for the first time, the AIM B creates through PEIG a a request for synchronization of the PEIG Map from the AIM A. The AIM A of the main service provider A generates a unique identifier Ba designated for the other service provider B and assigned to the PEIG a. The AIM A saves the identifier Ba into a previously created record PEIG Map for further use. The AIM A also transmits through the PEIG a in the synchronized PEIG Map the identifier Ba to the AIM B. The AIM B saves the identifier Ba into the record PEIG Map of the other provider B.

When creating the replica of the PEIG a and PEIG b, the AIM A of the service provider A generates all missing unique identifiers Xa or Xb designated for other service providers X and assigned to the PEIG a and PEIG b, so it generates also the missing unique identifier Bb designated for the service provider B and assigned to the PEIG b. These identifiers are stored into the record PEIG Map for further use. Also other pieces of information are saved into the PEIG Map, such as the time of creating the replica, local identifiers for PEIGs designated to be used by the main service provider A.

When creating a PEIG replica, the AIM A synchronizes through the PEIG a and PEIG b the updated PEIG Map to all other service providers X that at the time of the replica have identities created either in the PEIG a or in the PEIG b. This applies also to the other service provider B. So the AIM B gets the newly created identifier Bb linked with the identifier Ba. The AIM B uses the received synchronized PEIG Map to create its own record PEIG Map and stores it for further use. This record contains the information that the identifier Ba defined by the main service provider A belongs to the PEIG a and the PEIG a is in replica with another PEIG having the identifier Bb defined by the main service provider A. The further procedure is identical to Example 1.

EXAMPLE 3

Assigning Several PEIGs to the Account of One User, Their Interchangeable Use for Authentication The example 3 describes the situation when the user first uses one PEIG a with an other provider B, after that he creates a replica of the PEIG a and PEIG b at the main service provider A, and finally he uses the other PEIG b with the other service provider B.

When using the PEIG a at the other service provider B for the first time, the AIM B requests through PEIG a synchronization of the PEIG Map from the AIM A to the AIM B. Since the PEIG a does not have any identity created for the main service provider A at that moment, no PEIG Map is synchronized to the AIM B of the other service provider B.

When creating the replica of the PEIG a and PEIG b, the AIM A of the main service provider A generates all missing unique identifiers Xa or Xb designated for all other service providers X and assigned to the PEIG a or PEIG b, so it generates also the missing unique identifiers Ba and Bb designated for the service provider B and assigned to the PEIG a and PEIG b. These identifiers are stored into the record PEIG Map for further use. Also other pieces of information are optionally saved into the PEIG Map, such as the time of creating the replica, local identifiers for PEIGs designated to be used by the main service provider A.

When creating a PEIG replica, the AIM A synchronizes through PEIG a and PEIG b the updated PEIG Map to all other service providers X that at the time of the replica have identities created either in the PEIG a or in the PEIG b. This applies also to the other service provider B. So the AIM B gets the newly created mutually linked identifiers Ba and Bb.

The AIM B uses the received synchronized PEIG Map to create its own record PEIG Map and stores it for further use. This record contains the information that the identifier Ba defined by the service provider A belongs to the PEIG a and the PEIG a is in replica with another PEIG b having the identifier Bb defined by the main service provider A.

The further procedure is identical to Example 1.

EXAMPLE 4

Assigning Several PEIGs to the Account of One User, Their Interchangeable Use for Authentication The example 4 describes the situation when the user first uses one PEIG a with the other provider B, after that he creates the replica of the PEIG a and PEIG b at the main service provider A, and finally he uses the second PEIG b with the other service provider B. However the synchronization did not occur or the synchronization during creating the replica (as described in the example 3) failed.

When using the PEIG a with the main service provider A for the first time, the AIM A of the main service provider A generates unique identifiers Xa designated for all other service providers X and assigned to the PEIG a. Since the other service provider B is already in the list of providers at PEIG a at that moment, the AIM A of the main service provider A in cooperation with the PEIG a generate the unique identifier Ba designated for the service provider B and assigned to the PEIG a. This identifier is stored into the record PEIG Map in the database AIM A for further use. At the same time the PEIG a is used to transmit the identifier Ba to the AIM B of the other service provider B. The AIM B maps the identifier Ba to its record PEIG Map for further use.

When creating the replica of the PEIG a and PEIG b, the AIM A of the main service provider A generates all missing unique identifiers Xa or Xb designated for all other service providers X (at which the PEIG a and b were used for authentication in the past) and assigned to the PEIG a and PEIG b, so it generates also the missing unique identifiers Ba or Bb designated for the service provider B and assigned to the PEIG a and PEIG b. These identifiers are mapped to the record PEIG Map in the database AIM A for further use. Also other pieces of information are optionally saved into the PEIG Map, such as the time of creating the replica, local identifiers of PEIGs designated to be used by the main service provider A.

When creating the replica of the PEIGs, the synchronization of AIM A to AIM B fails, e.g. due to a communication timeout.

Further the example 4 is identical to the example 1.

For completeness, it should be added that when using the PEIG b at the other service provider B for the first time, the AIM B uses the identifier Ba in the received synchronized PEIG Map to find a previously saved PEIG Map corresponding to the PEIG a in its data storage.

EXAMPLE 5

Loss of PEIG—Self-Recovery After Emergency

The example 5 describes the situation, when the user created a replica of the PEIG a and b according to examples 1 to 4, so he has both PEIGs assigned to his user account at the main service provider A.

An emergency occurs, wherein the user discovers that one PEIG from the replica got lost or stolen and he wants to prevent this PEIG to be used by an unauthorized person to access his accounts at the main service provider and all other service providers. So the user wants to use the backup replica. The PEIG with the backup replica was not used for authentication to any other provider yet and does not have the cybernetic identity for the other provider available. He also wants to add another PEIG to the replica, so that he can use two PEIGs and prepares a backup as he had before the emergency occurred. There can be also a special case of using the second PEIG as a backup one.

The user lost the possibility to use the PEIG a.

The user still has the PEIG b that was never used with the other service provider B.

In case of emergency, the user uses the PEIG b to access the PEIG revocation service at the main provider A. After being authenticated and authorized using the PEIG b, the user enters the command for a central revocation of the PEIG a.

Following this command, the AIM A blocks the possibility to use the PEIG a for accessing the account of the user and or entering the central revocation command with PEIG a. At the same time, the AIM A creates synchronization records for all other providers including the other provider B, said records flagging PEIG a to be blocked. To this end, it uses the identifier Ba of the PEIG a for the other provider B mapped previously to the record PEIG Map.

The synchronization record is transmitted via direct synchronization channel to the other provider B and passed to the AIM B. Following the received synchronization record the AIM B blocks the use of PEIG a for accessing the user account at the other provider B. The identifier Bb will be kept in the record PEIG Map and linked with the account of the user. This allows the user to use the PEIG b for accessing his own account at the other provider B. The user also uses the PEIG c to create a replica as described in the example 1. When creating the replica, the AIM A creates identifiers, including a unique identifier Bc for the other provider B, this identifier will be transmitted to the AIM B and mapped to the PEIG Map there.

This procedure can be applied in the same way to an unlimited number of other providers.

EXAMPLE 6

Loss of PEIG—Self-Recovery After Emergency

The example 6 describes the situation when the user has created a replica of the PEIGs a and b according to examples 1 to 4, so he has both PEIGs assigned to his user account at the main service provider A.

An emergency occurs, wherein the user discovers that one PEIG from the replica was lost or stolen and he wants to prevent this PEIG to be used by an unauthorized person to access his accounts at the main service provider and at all other service providers. The user wants to use the backup replica that is still available to him He also wants to add another PEIG to the replica, so he will be able to use two PEIGs and will have a backup as he had before the emergency occurred.

In contrast to the example 5, the user lost the possibility to use the PEIG b.

The user still has the PEIG a that was already used at the other service provider B. The PEIG b was never used at the other service provider B.

In the emergency, the user uses the PEIG a to access the PEIG revocation service at the main provider A. After being authenticated and authorized using the PEIG a, the user enters the command for a central revocation of the PEIG b.

Following this command the AIM A blocks the use of PEIG b for accessing the account of the user and for entering the central revocation command with PEIG b. At the same time, the AIM A creates synchronization records for all other providers including the other provider B flagging PEIG b to be blocked. To this end, it uses the identifier Bb of the PEIG b for the other provider B mapped previously to the record PEIG Map.

The synchronization record is transmitted via direct synchronization channel to the other provider B and passed to the AIM B. There is no record for the PEIG b in the AIMB B, because the PEIG b was never used with the other service provider B. Following the received synchronization record the AIM B finds the record PEIG Map, to which the identifier Bb is mapped. It is the PEIG Map mapped to the PEIG a and to the user's account. Into this PEIG Map the AIM B maps the revocation flag to the identifier Bb.

Using the PEIG b at the other service provider B for the first time triggers the procedure described in the example 1, but in accordance with the revocation flag the PEIG b is not allowed to access the user account and the AIM B prevents the PEIG b from being used.

The user also uses the PEIG c to create a replica as described in the example 1. When creating the replica, the AIM A generates identifiers, including a unique identifier Bc for the other provider B that will be transmitted to the AIM B and mapped to the PEIG Map there.

This procedure can be applied in the same way to an unlimited number of other providers.

EXAMPLE 7

Loss of PEIG—Assisted Recovery After Emergency

The user has created a replica of the PEIGs a and b according to examples 1 to 4, so he has both PEIGs assigned to his user account at the main service provider A.

An emergency situation occurs, wherein the user discovers that one PEIG from the replica or both of them were lost or stolen and he wants to prevent any PEIG to be used by an unauthorized person to access his accounts at the main service provider and all other service providers.

In this case no more PEIGs can be added to the replica.

The user performs an assisted recovery, which means that he contacts the relevant authorized person at the main service provider A; this person verifies the user identity and after performing the necessary acts, the authorized person enters the command for a centralized revocation of all PEIGs of the user to the AIM A.

The AIM A verifies the authorization of the authorized worker; if the result is positive, it searches for all PEIGs of the user based on the record PEIG Map and performs the centralized revocation of all PEIGs of the user as described in the example 5.

EXAMPLE 8

Centralized Identity Verification

The main service provider A is capable of verifying the identity of the relevant user, thus it performs the function of the verification service provider. The user cooperates with the main service provider A during the identity verification process (e.g. shows up in person with the relevant personal document at the branch of the main service provider, where his identity is verified and the personal information about the user is securely linked with the PEIG of the user). The user wants to use his PEIG also at other service providers and does not want to repeat the identity verification process.

When the user uses the identity verification processed by the main provider and his accounts at other providers are created, an emergency occurs, wherein the user loses the possibility to use the PEIG linked with his accounts and his identity verification (e.g. malfunction, loss, theft, forgetting or other reason of not being able to use the second factor).

The user needs to recover from that situation, he does not want to repeat the identity verification process at other service providers, nor does he want to lose his assets connected to his account at other service providers. However he is ready to repeat the identity verification process with the main service provider A and he wants to link a new PEIG with all his original accounts at all other service providers. At the same time, the original (lost, stolen) PEIG for accessing the original accounts at all other providers should get blocked.

The user has the PEIG a and he uses it to create an account at the main service provider A. During that or after that his identity is verified e.g. at the workplace of the main service provider A. The user is assigned a local unique identifier (user database index) UDI A, which, as well as the verified personal data, is recorded into the information system of the main service provider A. The local identifier UDI A is recorded also into the database AIM A.

Then the user uses the PEIG a at the other service provider B, where he wants an account to be created. The other service provider B allows the results of the identity verification to be taken over from the main service provider A. When the operation of taking the identity verification results over between the other service provider B and the main service provider A takes place, the AIM A generates a user reference identifier URID B for the other service provider B. Also the unique identifier Ba for the PEIG a for the other service provider B is generated.

The user reference identifier URID B and the PEIG identifier Ba together with the UDI A are stored into the AIM A at the record PEIG Map for further use.

During the operation of taking over the identity verification results, the user reference identifier URID B together with the PEIG identifier Ba are transmitted from the AIM A via PEIG a to the AIM B. At the AIM B the user reference identifier URID B is linked with the local unique user identifier UDI B, the identifier Ba is linked with the internal record of the PEIG a. The AIM B, based on the received synchronized PEIG Map, creates or modifies its own record PEIG Map and saves it for future use. At the same time, the necessary verified personal information is transmitted between the main service provider A and the other service provider B and linked to the local user identifier UDI B.

When the emergency occurs, the user with the new PEIG b undergoes the repeated identity verification processed by the main service provider A. This process verifies that it is a repeated identity verification of the same person and the new PEIG b is linked with original personal information and the original local user identifier UDI A. The AIM A evaluates this so that it automatically blocks the original PEIG a for accessing the user account of the user, and allows the new PEIG b to be used. The AIM A also modifies the previously stored record PEIG Map by mapping the new PEIG b to it and stores it for further use.

When the user uses the new PEIG b at the other service provider B, the other service provider B evaluates it as an unknown user access. The other provider B allows the identity verification results to be taken from the main service provider A. During the operation of taking over the identity verification results between the other service provider B and the main service provider A, the AIM A uses the previously stored PEIG Map to identify the original user reference identifier URID B for the other service provider B.

The original user reference identifier URID B is transmitted from the AIM A via new PEIG b to the AIM B. The transmitted user reference identifier URID B at the AIM B is used to find the previously stored record PEIG Map, wherein the identifier URID B is linked with the original local unique user identifier UDI B. Thus the original user account is linked with the new PEIG b.

The AIM B modifies its record PEIG Map from the received synchronized PEIG Map and stores it for further use. At the same time, the AIM B evaluates it so that it automatically prevents the original PEIG a from being used for accessing the user account of the user, and allows the new PEIG b to be used.

This procedure can be applied in the same way to an unlimited number of other providers.

EXAMPLE 9

Centralized Identity Verification

The main service provider provides identity verification of the relevant user, so it performs the function of the verification service provider. The user cooperates with the main service provider A during the identity verification process (e.g. shows up in person with the relevant personal document at the branch of the main service provider, where his identity is verified and the personal information about the user is securely linked with the PEIG of the user). The user wants to use his PEIG also with other service providers and does not want to repeat the identity verification process.

When the user uses the identity verification processed by the main provider and his accounts at other providers are created, an emergency occurs, wherein the user loses the possibility to use the PEIG linked with his accounts and his identity verification (e.g. malfunction, loss, theft, forgetting or other reason of not being able to use the second factor).

The user needs to recover from this situation, he does not want to repeat the identity verification process at other service providers, nor does he want to lose his assets connected to his account at other service providers. However he is ready to repeat the identity verification process at the main service provider A and he wants to link a new PEIG with all his original accounts at all other service providers. At the same time, the original (lost, stolen) PEIG for accessing the original accounts at all other providers should get blocked to prevent it from being used.

The example 9 differs from the example 8 by the communication method between service providers and by the revocation process.

The user has the PEIG a that is used to create an account at the main service provider A. During this process or afterwards, his identity is verified e.g. at the workplace of the main service provider A. The user is assigned the local user identifier (user database index) UDI A; this identifier and the verified personal data are recorded into the information system of the main service provider A. The local user identifier UDI A is stored also in the database AIM A.

Then the user uses the PEIG a at the other service provider B, where he wants an account to be created. The other service provider B allows the identity verification results to be taken over from the main service provider A. During the operation of taking over the identity verification results between the other service provider B and the main service provider A, the AIM A generates the user reference indicator URID B for the other service provider B. Also a unique identifier Ba for the PEIG a for the other service provider B are generated.

The user reference identifier URID B and the PEIG identifier Ba, as well as the UDI A, are stored at the AIM A into the record PEIG Map for further use.

During the operation of taking over the identity verification results, the user reference identifier URID B together with the PEIG identifier Ba are transmitted from the AIM A via PEIG a to the AIM B. At the AIM B the user reference identifier URID B is linked with a local unique user identifier UDI B, the identifier Ba is linked with the internal record of the PEIG a. The AIM B uses the received synchronized PEIG Map to create or modify its own record PEIG Map and saves it for future use. At the same time, the verified personal information is transmitted between the main service provider A and the other service provider B and connected to the local user identifier UDI B.

When an emergency occurs, the user with the new PEIG b undergoes the repeated identity verification processed by the main service provider A. This process verifies that it is a repeated identity verification of the same person and the new PEIG b is linked with the original personal information and the original local user identifier UDI A.

The AIM A evaluates it so that it automatically blocks the original PEIG a for use for accessing the user account of the user, and allows the new PEIG b to be used. The AIM A also modifies the previously stored record PEIG Map by mapping the new PEIG b to it and stores it for further use.

At the same time, the AIM A creates a synchronization record for all other providers including the other service provider B to block the PEIG a. For that the PEIG identifier Ba stored previously into the record PEIG Map for the other service provider B is used. The synchronization record is transmitted via direct synchronizing channel to the other service provider B and passed to the AIM B.

According to the received synchronization record, the AIM B prevents the PEIG a from being used for accessing the user account at the other service provider B.

When the user uses the new PEIG b with the other service provider B, the other service provider B evaluates it as an unknown user access. The other provider allows the identity verification results to be taken from the main service provider A. During the operation of taking over the identity verification results between the other service provider B and the main service provider A, the AIM A uses the previously stored PEIG Map to identify an original user reference identifier URID B for the other service provider B.

The original user reference identifier URID B is transmitted from the AIM A via new PEIG b to the AIM B. The transmitted user reference identifier URID B at the AIM B is used to find the previously stored record PEIG Map, where the identifier URID B is linked with the original local unique user identifier UDI B. Thus the original user account is connected with the new PEIG b. The AIM B modifies its own record PEIG Map from the received synchronized PEIG Map and stores it for further use.

This procedure can be applied in the same way to an unlimited number of other providers.

EXAMPLE 10

Centralized Identity Verification

The user creates a replica, i.e. connects two or more PEIGs to his account only at first main service provider A1, as shown in examples 1 to 4.

At the same time, a second main provider, i.e. a verification service provider A2, verifies the identity of the relevant user in the same way as shown in examples 8 and 9.

After having created the replica at the first main service provider A1 and having used the previously performed identity verification from the verification service provider A2 to create his accounts at other service providers, an emergency occurs, wherein the user loses its possibility to use all PEIGs in the replica (e.g. malfunction, loss, theft, forgetting or other reason of not being able to use the second factor).

The user needs to recover from such situation, and he does not want to repeat the identity verification process at other service providers, nor does he want to lose his assets connected to his account at other service providers. However he is ready to repeat the identity verification process at the verification service provider A2 and he wants to link a new PEIG with all his original accounts at all other service providers.

At the same time, the original (lost, stolen) PEIGs for accessing the original accounts at all other providers should get blocked to prevent them from being used.

First of all, the user creates a replica as shown in examples 1 to 4.

Thus, a PEIG Map containing unique identifiers Ba and Bb for both PEIGs in replica for the other provider B and also unique identifiers A2a and A2b for both PEIGs in replica for the verification service provider A2 is created at the AIM A1. At the same time, the identifiers Ba and Bb are mapped to the record PEIG Map at the AIM B of the other service provider B. The identifiers A2a and A2b are mapped to the record PEIG Map at the AIM A2 of the second main provider A2.

After that the user undergoes identity verification at the workplace of the verification service provider A2, where he uses one PEIG from the replica (either PEIG a, or PEIG b) as shown in the example 8.

This modifies the record PEIG Map at the AIM A2 by adding the user reference identifier URID B and both identifiers of both PEIGs Ba and Bb. Also the record PEIG Map at the AIM B of the other service provider B is modified by adding the user reference identifier URID B and both identifiers of both PEIGs Ba and Bb.

When the emergency occurs, the user with a new PEIG c undergoes a repeated identity verification at the verification service provider A2. This process verifies that it is a repeated identity verification of the same person and the new PEIG c is linked with the original personal information and the original local user identifier UDI A2.

The AIM A2 evaluates it so that it automatically blocks all original PEIGs a and b from being used for accessing the user account of the user, and allows the new PEIG c to be used. The AIM A2 also modifies the previously stored record PEIG Map by adding the link to the new PEIG c to it and stores it for further use.

At the same time, the AIM A2 creates synchronization records for all other providers including the other service provider B flagging both the PEIG a and PEIG b for blocking. For that the identifiers Ba and Bb of the PEIG a and b stored previously into the record PEIG Map for the other service provider B are used.

The synchronization record is transmitted via direct synchronization channel to the other service provider B and passed to the AIM B. According to the received synchronization record the AIM B blocks the PEIG a and b against accessing the user account at the other service provider B.

At the same time, the AIM A2 creates synchronization records for the main service provider A1 flagging both the PEIG a and PEIG b for blocking. For that the identifiers A2a and A2b of the PEIG a and b stored previously into the record PEIG Map for the main service provider A1 are used. The synchronization record is transmitted via direct synchronization channel to the main service provider A1 and passed to the AIM A1. According to the received synchronization record the AIM A1 blocks the PEIGs a and b for accessing the user account at the other service provider A1.

At the same time, the AIM A1 uses the previously stored record PEIG Map to determine all unique identifiers Xa and Xb designated for all other service providers X and creates synchronization records for all other service providers X (including the other service provider B). The verification service provider A2, from which the synchronization record was received, is skipped.

The synchronization records are transmitted via direct synchronization channels to individual other service providers X including the other service provider B.

This prevents both PEIG a and PEIG b from being used at any other service providers that did not take over the centralized identity verification, so they do not have any direct relation to the verification service provider A2.

The next steps are the same as in the example 9.

This procedure can be applied in the same way to an unlimited number of other providers regardless of the fact whether the other provider takes over the identity verification results or not.

EXAMPLE 11

Expired Cryptographic Material in PEIG for Other Service Providers

The user creates a replica, i.e. assigns two or more PEIGs to his account only at first main service provider A, as shown in examples 1 to 4.

An emergency situation occurs, wherein the user discovers that the PEIG which was used was lost or stolen. The user wants to prevent this PEIG to be used by an unauthorized person to access his accounts at the main service provider and all other service providers. Furthermore, the user wants to use the backup PEIG to recover from the emergency. The backup PEIG has already been used at other service providers in the past. Since the user did not use the backup PEIG for a long time, the validity of the cryptographic material expired, but only at other service providers.

So the user uses his backup PEIG b for accessing self-service PEIG management interface operated by the main service provider A, to which he authenticates using the PEIG b. The user enters a command to revoke the PEIG a, which thus gets blocked as shown in the example 5.

However when using the backup PEIG b at the other service provider B, the outdated cryptographic material is evaluated as expired. Consequently, synchronization of the PEIG Map is requested by PEIG b from the main service provider A.

When synchronizing the PEIG Map, the PEIG b is authenticated at the main service provider A, so the validity of the cryptographic material in the PEIG b is also verified at the main service provider A with a positive result.

When the synchronized PEIG Map is transmitted, it is compared with the data record PEIG Map stored previously at the AIM B. If they match, the cryptographic material in the PEIG b is allowed to be updated at the other service B and this change is performed. By doing so, the expired cryptographic material is replaced with a fresh one.

EXAMPLE 12

Expired Cryptographic Material in PEIG for All Service Providers

The user creates a replica, i.e. assigns two or more PEIGs to his account at the main service provider A, as shown in examples 1 to 4.

wherein the user discovers that the PEIG which was used was lost or stolen. The user wants to prevent this PEIG to be used by an unauthorized person to access his accounts at the main service provider and all other service providers. Furthermore, the user wants to use the backup PEIG to recover from the emergency. The backup PEIG has already been used at other service providers in the past. Since the user did not use the backup PEIG for a long time, the validity of the cryptographic material expired, both for other service providers and for the main service provider.

The process shown in the example 11 cannot be used, because the cryptographic material in the backup PEIG for the main provider has expired.

First of all, the procedure described in the example 11 is followed till the request through PEIG b for synchronization of the PEIG Map from the main provider A. This synchronization fails, because the cryptographic material in the PEIG b for the main provider A used in this example is expired. The use of the backup PEIG b with the other service provider B is thus not successful.

The user requests cooperation from a person previously authorized by him or an authorized person of the main service provider A. This person uses his own PEIG having the relevant access rights at the main service provider A to set an attribute allowing an emergency recovery of the cryptographic material for the PEIG b at the AIM A.

After that the user uses the PEIG b at the main service provider A. Since the AIM A has an active attribute allowing an emergency recovery of the cryptographic material for the PEIG b, the cryptographic material of the PEIG b at the main provider A is updated. Thus, the expired cryptographic material used with the main provider A is replaced with a fresh one. The user then uses the backup PEIG b at the other provider B.

The following procedure is identical with the sequence described in the example 11 from the step of using the backup PEIG b at the other provider B onwards.

EXAMPLE 13

Updating Verified Personal Information/Data

A main service provider A verifies the identity of a user in the same way as in the example 8. The user wants to use his PEIG also at other service providers and does not want to undergo the identity verification repeatedly.

After using the identity verification processed by the main service provider A to create the user's accounts at other service providers, the previously verified personal information of the user, e.g. place of residence, changes.

The main service provider A verifies the changed personal information. The user does not want to report the changed information to the other service provider B and verify the changed information repeatedly. Nevertheless the other service provider B needs the updated personal information.

In the record PEIG Map at the AIM A, user reference identifier URID B and local user identifier UDI A used by the information system of the main service provider A are stored, as well as other pieces of information. At the AIM B, user reference identifier URID B and local user identifier UDI B used by the information system of the other service provider B are stored.

The verified personal information is stored in the internal database of the information system of the main service provider A, where it is linked with the local user identifier UDI A.

The verified personal information is stored in the internal database of the information system of the other service provider B, where it is linked with the local user identifier UDI B.

When the main service provider A verifies the updated personal information of the user, this updated personal information is stored into the information system of the main service provider A, where it is linked with the local user identifier UDI A.

The information system of the main service provider A requests a remote update of the personal information from the AIM A to the other service provider B and transmits the updated personal information as well as the local user identifier UDI A. The AIM A searches the PEIG Map for the record containing the local user identifier UDI A and obtains the user reference identifier URID B from this record. The the AIM A transmits the request for the personal information update, the user reference identifier URID B and the updated personal information via direct synchronization channel to the other service provider B, where it is passed to the AIM B.

The AIM B finds the record with the user reference identifier URID B in its records of PEIG Map and obtains the local user identifier UDI B from this record. Then the AIM B transmits the request for the personal information update together with the local user identifier UDI B and with the updated personal data to the information system of the other service provider B, and the information system of the other service provider B registers the change into the internal database. This procedure can be applied in the same way to an unlimited number of other providers.

EXAMPLE 14

Transaction Between Two Service Providers

The user wants to make a one-time transaction between two service providers. This transaction consists in transmitting data directly between information systems of both providers in a way which ensures that both service providers consider the transaction as securely connected to the user. The transaction can be e.g. money transfer from user bank account for goods that the user purchased from a seller. Neither of the service providers has to be the main service provider.

The user has a PEIG a and creates an account at the service provider A using the PEIG a. A local unique user identifier UDI A is assigned to the user, and together with other data recorded into the information system of the service provider A. The identifier UDI A is recorded also into the AIM A database.

Then the user uses the PEIG a at the service provider B, where the transaction with the service provider A should be performed. The user is assigned a local unique user identifier UDI B at the service provider B; this identifier together with other data is recorded into the information system of the service provider B. The local user identifier UDI B is recorded also in the AIM B database.

The service provider B requests through the AIM B the one-time transaction with the service provider A. When processing this one-time transaction between the other service provider B and the service provider A, a user one-time identifier UOTID B for the other service provider B at the AIM A is generated in cooperation between the AIM B, AIM A and PEIG a.

The one-time identifier UOTID B as well as the UDI A are stored into the record PEIG Map at the AIM A for further use.

The one-time identifier UOTID B is transmitted from the AIM A via PEIG a to the AIM B. At the AIM B, the one-time identifier UOTID B is linked with the local user identifier UDI B. The AIM B uses the received synchronized PEIG Map to create or modify its own record PEIG Map and stores it for further use.

Then the information system of the service provider B requests the AIM B to complete the one-time transaction with the service provider A, and transmits the transaction parameters and the local user identifier UDI B.

In its records, the AIM B finds the PEIG Map with identifier UDI B and obtains the one-time identifier UOTID B. Then the AIM B transmits the request to complete the transaction together with the one-time identifier UOTID B and the transaction parameters via direct synchronization channel to the provider A, where they are passed to the AIM A.

The AIM A finds the record with the one-time identifier UOTID B in its records of PEIG Maps and obtains the local user identifier UID A from this record. Then it passes the request to complete the transaction, together with the local user identifier UDI A and the transaction parameters, to the information system of the service provider A.

The information system of the service provider A uses the local user identifier UDI A to process the transaction, enters the changes into the internal database and transmits the transaction return values to the AIM A.

The AIM A transmits the transaction return values via direct synchronization channel to the service provider B, where the values are passed to the AIM B.

The AIM B transmits the transaction return values and the local user identifier UDI B to the information system of the service provider B to be processed.

When the transaction is completed, the AIM A and AIM B remove the one-time identifier UOTID B from their PEIG Map records.

The invention claimed is:

1. An authentication system for use with personal electronic identity gadgets of at least one user of services, wherein the said personal electronic identity gadgets are configured to authenticate to a main service provider (for all personal electronic identity gadgets of this service user) and are configured to trigger synchronization of data storages of service providers; wherein the said system is characterized in that it comprises
   a data storage of an authentication system server component of at least one main service provider, wherein the said data storage is synchronizable with data storage(s) of server component(s) of at least one other service provider, either directly or via personal electronic identity gadgets, and wherein the said authentication system server component of the at least one main service provider is configured for mapping personal electronic identity gadgets to the account of the user of services;
   a data storage of an authentication system server component of at least one other service provider that is synchronizable with the data storage of the authentication system server component of the at least one main service provider, either directly or via personal electronic identity gadget;
   wherein:
   the data storage of the authentication system server component of each service provider contains, for each personal electronic identity gadget registered to this provider for the said user of services, a record with data for authenticating this personal electronic identity gadget,
   the data storage of the authentication system server component of the main service provider contains identifiers assigned to personal electronic identity gadgets and/or to users, wherein for each personal electronic identity gadget of a user and/or for each user, a separate identifier is assigned for each service provider for whom at least one personal electronic identity gadget of the user is assigned to the user account;
   the data storage of the authentication system server component of the main service provider contains a map of personal electronic identity gadgets for each user account, in the said map the records for all personal electronic identity gadgets of the said user in the said data storage are mapped to the said user account, furthermore the map contains the identifiers assigned to the personal electronic identity gadgets of the said user for all service providers and/or the identifiers assigned to the said user for all service providers;
   the data storage of the authentication system server component of other service provider contains at least the identifiers assigned to personal electronic identity gadgets and/or to users of this other service provider;
   the data storage of the authentication system server component of other service provider contains a map of personal electronic identity gadgets for each user account, wherein in the said map, the records for all personal electronic identity gadgets of the said user in this data storage are mapped to the said user account, furthermore the map contains the identifiers assigned to the personal electronic identity gadgets of the said user for at least this other service provider and/or the identifier assigned to the said user for at least this other service provider;
   the data storages and/or the authentication system server components are configured so that the identifiers assigned to the personal electronic identity gadgets assigned to the account of one user and/or identifiers assigned to one user are synchronizable by transmitting synchronization information between the data storages of the authentication system server components and/or between the authentication system server components, directly or via personal electronic identity gadgets.

2. The authentication system according to claim 1, characterized in that
   the data storage of the authentication system server component of each service provider contains, for each personal electronic identity gadget of the said user of services, a record with data for authenticating this personal electronic identity gadget,
   the data storage of the authentication system server component of the main service provider contains a map of personal electronic identity gadgets for each user account, in the said map the records for all personal electronic identity gadgets of the said user in the said data storage are mapped to the said user account, furthermore the map contains identifiers assigned to the personal electronic identity gadgets of the said user for all service providers, wherein a separate identifier is assigned for each personal electronic identity gadget of the said user for each service provider for whom at least one personal electronic identity gadget is registered for the said user account;
   the data storage of the authentication system server component of other service provider contains a map of personal electronic identity gadgets for each user account, wherein in the said map, the records for all personal electronic identity gadgets of the said user in this data storage are mapped to the said user account, furthermore the map contains the identifiers assigned to the personal electronic identity gadgets of the said user for at least this other service provider (and optionally for further other service providers for whom at least one personal electronic identity gadget is registered for the said user account);
   the data storages and/or the authentication system server components are configured so that the identifiers assigned to the personal electronic identity gadgets assigned to the account of one user are synchronizable by transmitting synchronization information between the data storages of the authentication system server components and/or between the authentication system server components, directly or via personal electronic identity gadgets.

3. The authentication system according to claim 1, characterized in that identifiers assigned to the user are mapped to the map of personal electronic identity gadgets for the user account in the data storage of the authentication system server component of the main service provider, wherein a separate identifier is assigned for each service provider for this user; and identifiers of the user assigned at least to another service provider are mapped to the map of personal electronic identity gadgets for the user account in the data storage of the authentication system server component of the said other service provider; wherein a local user identifier is mapped to the map of personal electronic identity gadgets of this user for each service provider.

4. A method of user authentication using a personal electronic identity gadget (PEIG) in the authentication system for use with the said personal electronic identity gadgets of at least one user of services, wherein the said personal electronic identity gadgets are configured to authenticate to a main service provider (for all PEIGs of this service user) and are configured to trigger synchronization of data storages of service providers; wherein the said system comprises
- a data storage of an authentication system server component of at least one main service provider, wherein the said data storage is synchronizable with data storage(s) of server component(s) of at least one other service provider, either directly or via personal electronic identity gadgets, and wherein the said authentication system server component of the at least one main service provider is configured for mapping personal electronic identity gadgets to the account of the user of services (user account);
- a data storage of an authentication system server component of at least one other service provider that is synchronizable with the data storage of the authentication system server component of the at least one main service provider, either directly or via personal electronic identity gadget;

wherein the method is characterized in that
- in the data storage of the authentication system server component of the main service provider, a record containing data for authentication of the personal identity gadget is assigned to each personal electronic identity gadget during its registration to the user account;
- in the data storage of the authentication system server component of the main service provider, the records of all personal electronic identity gadgets assigned to the account of one user of services are mapped to a map of personal electronic identity gadgets for the said user account; and identifiers assigned to all personal electronic identity gadgets of the said user or/and to the said user are mapped to the said map of personal electronic identity gadgets for the said user account, wherein a separate identified is assigned to each personal electronic identity gadget of the said user and/or to the said user for each service provider for whom any personal electronic identity gadget of this user is registered; and
- when any personal electronic identity gadget of the user is used at least for the first authentication to another service provider, this personal electronic identity gadget connects and authenticates to the main service provider and requests synchronization information from the authentication system server component of the main service provider, said synchronization information containing the map of personal electronic identity gadgets mapped to the said user's account and containing information on identifiers assigned to all personal electronic identity gadgets mapped to the map for at least the said other service provider and/or on identifiers assigned to the said user for at least the said other service provider; then the personal electronic identity gadget transmits this synchronization information to the authentication system server component of the said other service provider, wherein the authentication system server component of the said other service provider uses the synchronization information to amend the map of personal electronic identity gadgets and the information on identifiers in its data storage.

5. The method according to claim 4, characterized in that
- in the data storage of the authentication system server component of the main service provider, a record containing data for authentication of the personal identity gadget is assigned to each personal electronic identity gadget;
- in the data storage of the authentication system server component of the main service provider, the records of all personal electronic identity gadgets assigned to the account of one user of services are mapped to a map of personal electronic identity gadgets for the said user account; and identifiers assigned to all personal electronic identity gadgets of the said user are mapped to the said map of personal electronic identity gadgets for the said user account, wherein a separate identifier is assigned to each personal electronic identity gadget of the said user for each service provider for whom at least one personal electronic identity gadget of this user is registered;
and
- when any personal electronic identity gadget of the user is used at least for the first authentication to another service provider, this personal electronic identity gadget connects and authenticates to the main service provider and requests synchronization information from the authentication system server component of the main service provider, said synchronization information containing the map of personal electronic identity gadgets mapped to the said user's account and containing information on identifiers assigned to all personal electronic identity gadgets mapped to the map for at least the said other service provider for at least the said other service provider; then the personal electronic identity gadget transmits this synchronization information to the authentication system server component of the said other service provider, wherein the authentication system server component of the said other service provider uses the synchronization information to amend the map of personal electronic identity gadgets and the information on identifiers in its data storage.

6. The method according to claim 4, characterized in that at least at the beginning of the first process of authentication of the personal electronic identity gadget to another service provider, synchronization information is requested and transmitted to the other service provider through the personal electronic identity gadget.

7. The method according to claim 4, characterized in that when a first personal electronic identity gadget is lost, destroyed or stolen, the user authenticates to the main service provider with another personal electronic identity gadget and enters a command to revoke centrally the first personal electronic identity gadget;

the authentication system server component of the main service provider then prepares a synchronization message flagging the first personal electronic identity gadget to be blocked and/or rejected for authentication; this synchronization message is then transmitted via synchronization channels to all other service providers having registered any of the personal electronic identity gadgets mapped to the map of personal electronic identity gadgets of this user;

the other service providers use this synchronization message to synchronize the data in the map of personal electronic identity gadgets assigned to this user's account, wherein to identify this first personal electronic identity gadget the other service providers use identifiers assigned to this personal electronic identity gadget and mapped to their maps of personal electronic identity gadgets of this user.

8. The method according to claim 4, characterized in that when using a personal electronic identity gadget with expired cryptographic material to authenticate to another service provider, the authentication proceeds as a first-time authentication to this other service provider, thus the personal electronic identity gadget connects and authenticates to the main service provider, requests the main service provider to create the synchronization information containing a map of personal electronic identity gadgets and identifiers assigned to all personal electronic identity gadgets mapped to the map for at least this other service provider, and transmits this synchronization information to this other service provider; subsequently after having compared the map of personal electronic identity gadgets saved previously at this other service provider with the newly transmitted map, a new cryptographic material for authenticating this personal electronic identity gadget to this other service provider is created.

9. The method according to claim 4, characterized in that the authentication system configured to enable entry of an administrator of the main service provider that is authorized to enter a command for central revocation of all personal electronic identity gadgets of this user and/or enter a command to recover the cryptographic material in the personal electronic identity gadget for the main service provider.

10. The method according to claim 4, characterized in that identifiers assigned for the user are mapped to the map of personal electronic identity gadgets for the user's account in the data storage of the authentication system server component of the main service provider, wherein a separate identifier is assigned for the said user for each service provider having registered at least one personal electronic identity gadget of this user; and mapped to the map of personal electronic identity gadgets for the user's account in the data storage of the authentication system server component of the other service provider are the identifiers assigned to the said user for at least this other service provider; wherein for each service provider, a local user identifier is created that is not transmitted anywhere but is mapped to the map of personal electronic identity gadgets of this user at this service provider, wherein this local user identifier is generated by the relevant service provider at which it is located.

11. The method according to claim 10, characterized in that in centralized identity verification, the provider of verification services verifies the user identity or the changed user information, e.g. by means of an identification document; wherein if the provider of verification services differs from the main service provider, it transmits the result of the user identity verification or the changed user information to the main service provider; the result of the verification of the user identity or change of user information is transmitted to other service providers as part of synchronization information or during a separate operation of taking over the results of the user identity verification or changed user information together with a user reference identifier for the relevant other service provider, and on the basis of the user reference identifier the result is linked with the relevant local user identifier assigned to the user at this other service provider.

12. The method according to claim 10, characterized in that a direct transaction between two service providers is performed when a personal electronic identity gadget is connected to one service provider, wherein the relevant local user identifiers mapped to the map of personal electronic identity gadgets for this user are available at data storages of authentication system server components of both service providers; wherein in cooperation between the personal electronic identity gadget and authentication system server components of both service providers, the authentication system server component of the first service provider generates a user one-time identifier which is transmitted to the authentication system server component of the second service provider via personal electronic identity gadget;

in data storages of authentication system server components of both service providers, the user one-time identifier is linked with the local identifier of this user;

subsequently, application which requires the transaction to be processed at the second service provider requests the completion of the transaction and transmits the transaction parameters and the local user identifier for the second service provider to the authentication system server component of the other service provider;

the server component uses the local user identifier to search for the linked user one-time identifier in its data storage and transmits the request to complete the transaction, the transaction parameters and the user one-time identifier to the authentication system server component of the first service provider via direct synchronization channel; the authentication system server component of the first service provider uses the user one-time identifier to find the local user identifier for the first service provider in its data storage and transmits this local user identifier and transaction parameters to the application involved in the transaction at the first service provider;

when the transaction is completed, both service providers remove the user one-time identifier from their data storages.

13. Computer program comprising instructions which, when the program is executed by a computer, cause the computer to carry out the steps of the method of claim 4.

* * * * *